(No Model.) 2 Sheets—Sheet 1.
J. W. ROBERTS.
POTATO DIGGER.
No. 346,686. Patented Aug. 3, 1886.
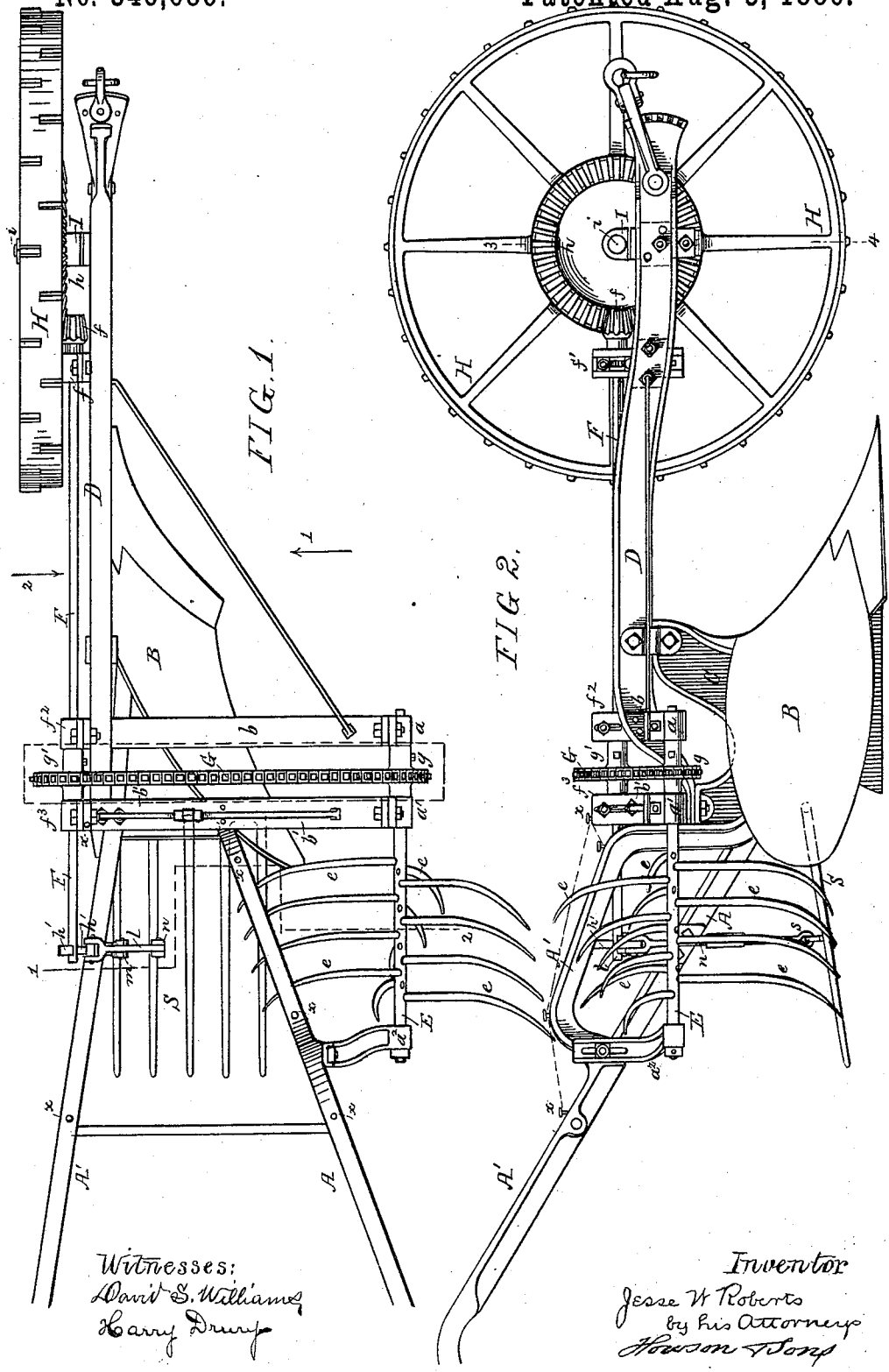
Witnesses:
David S. Williams
Harry Drury
Inventor
Jesse W. Roberts
by his Attorneys
Howson & Sons (No Model.) 2 Sheets—Sheet 2.
J. W. ROBERTS.
POTATO DIGGER.
No. 346,686. Patented Aug. 3, 1886.
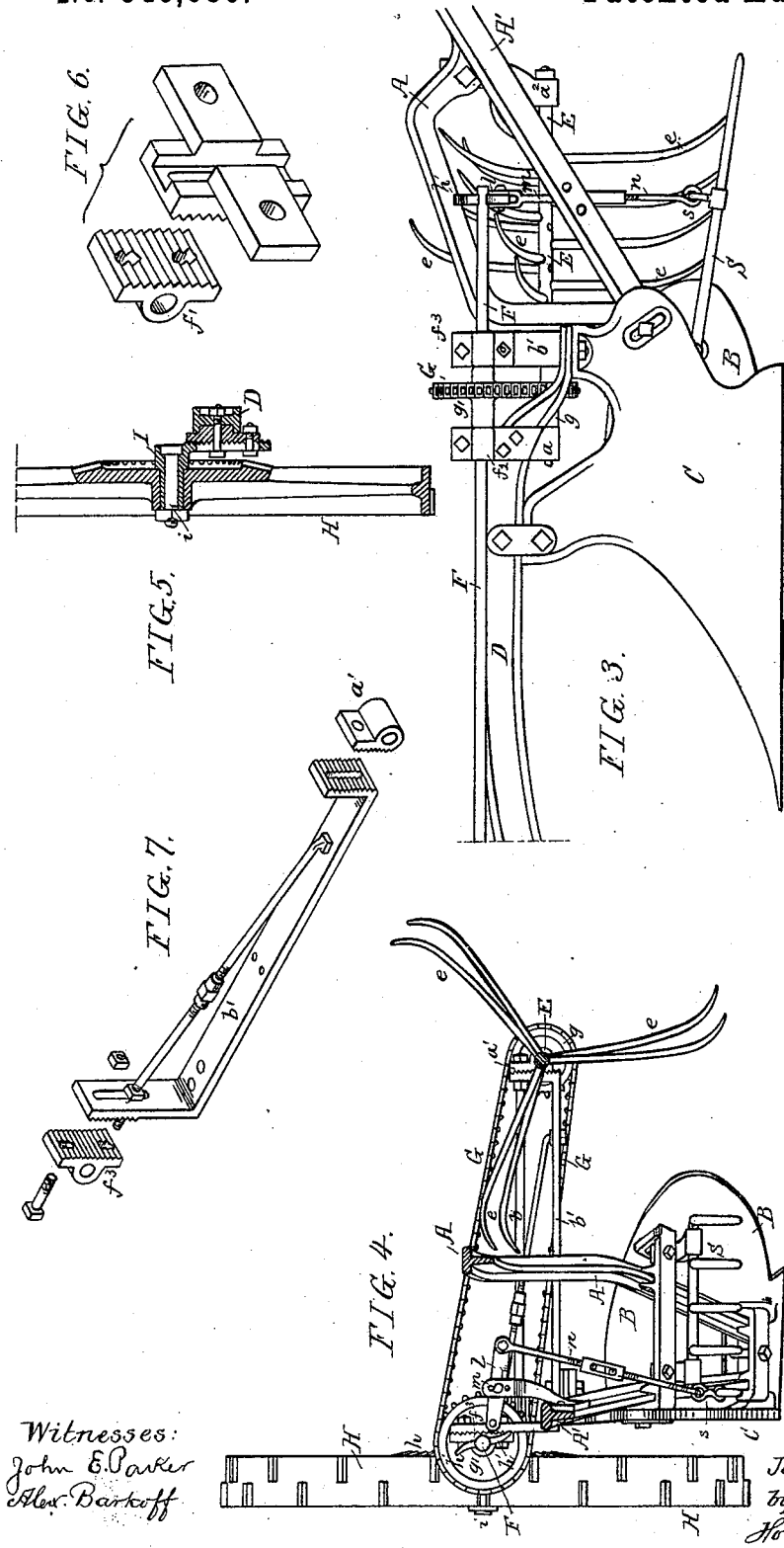
Witnesses:
John E. Parker
Alex. Barkoff
Inventor:
Jesse W. Roberts
by his Attorneys
Howson & Son

UNITED STATES PATENT OFFICE.

JESSE W. ROBERTS, OF PHILADELPHIA, PENNSYLVANIA.

POTATO-DIGGER.

SPECIFICATION forming part of Letters Patent No. 346,686, dated August 3, 1886.

Application filed January 11, 1886. Serial No. 188,230. (No model.)

*To all whom it may concern:*

Be it known that I, JESSE W. ROBERTS, a citizen of the United States, residing in Philadelphia, Pennsylvania, have invented certain Improvements in Potato-Diggers, of which the following is a specification.

The main feature of my invention consists in the combination, with an ordinary plow, of rotary prongs and a shaker, so that as the hill of potatoes is turned over by the plow the prongs will transfer the potatoes laterally onto the shaker, by which the potatoes will be separated from the earth, as fully described hereinafter.

In the accompanying drawings, Figure 1 is a plan view of my potato-digger. Fig. 2 is a side view of the same, looking in the direction of the arrow 1, Fig. 1. Fig. 3 is a side view looking in the direction of the arrow 2, Fig. 1. Fig. 4 is a transverse section on the line 1 2, Fig. 1. Fig. 5 is a section on the line 3 4, Fig. 2; and Figs. 6 and 7 are detached perspective views of parts of the machine.

A A' represent the handles, B the mold-board, C the landside, and D the beam, of a plow of any ordinary construction. In suitable bearings in boxes $a$, $a'$, and $a^2$ is a shaft, E, situated at the mold-board side of the plow and carrying a series of prongs, $e$, three sets in the present instance, and of the peculiar form shown in the drawings. The shaft E is driven from a shaft, F, through the chain G and chain-wheels $g$ $g'$. The boxes $a$ $a'$ are adjustably secured to brackets $b$ $b'$, carried by the beam of the plow, while the box $a^2$ is adjustably secured to the handle A, as shown in Figs. 1 and 2, thus allowing the adjustment of the shaft E up or down, as desired.

It will be observed that the prongs $e$ on the shaft E are of a somewhat peculiar curved construction (clearly shown in Figs. 2 and 4)—that is to say, their ends are curved sidewise and backward, in order that as they revolve with their shaft E, as hereinafter described, they will operate on the unearthed potatoes to the best advantage without injuring them. I also prefer to set the prongs of each series a little in advance of each other, as shown in the drawings.

The shaft F is driven by a traction-wheel, H, which has a bevel-wheel, $h$, gearing into a bevel-pinion, $f$, on the shaft F. The bearing-boxes $f'$ $f^2$ for the shaft F are each adjustably secured to the beam D, and the box $f^3$ is adjustably secured to the bracket $b'$.

The traction-wheel H revolves on a pin, $i$, projecting from a bracket, I, (see Fig. 5,) which is adjustably secured to the outer end of the beam D, preferably in the manner shown in the drawings.

Pivoted to the rear of the plow is a shaker, S, which consists of an open frame, like a fork with a number of tines projecting backward. To this frame a vibrating shaking motion is imparted, through the medium of devices which I will now proceed to describe.

To the inner end of the shaft F are secured tappets $h'$ $h'$, adapted to act on one arm of a lever, $l$, which is pivoted to a bracket, $m$, secured to the handle A'. The other arm of the lever is connected to the shaker at $s$ by a rod, $n$, preferably adjustable, as is also the pivot. It will be seen, therefore, that as the machine is traversed over the potato-field along the rows of potatoes each row will be turned over by the mold-board of the plow, the plow-point passing below the potatoes. Thus the hard and tangled roots and grass are placed underneath and the mellow ground containing the potatoes turned over to the top. The revolving prongs $e$, being on the mold-board side of the plow, but behind it, are in line with this mellow ground and sufficiently above the bed of the cut furrow to clear the tangled roots and grass. As the machine is traversed the rotating prongs push the potatoes from the turned-up ground onto the jarring shakers. The prongs being constructed as above described, do not injure the potatoes, as they do not dig them out, but merely push them off onto the jarring shaker S. The latter, being vibrated as described, will shake off the earth still clinging to the potatoes, so that the latter will be left on the surface of the ground comparatively free from dirt and ready to be gathered up.

When the traction-wheel and horizontal shafts E and F are made vertically adjustable to permit the plow to work to different depths, I serrate the rear surfaces of the bearing-boxes and the respective plates and brackets to which they are attached, and vertical slots are provided in the flanges of the bearings and brackets through which the retaining-bolts pass.

I prefer to provide an inclosing-casing for the chain-wheels and chain, as indicated by dotted lines in Fig. 1, so as to prevent the dirt from getting into the gearing.

On the handles A A' and on the bracket b' I provide buttons x, to which I secure a covering, preferably canvas, to prevent the reins getting caught in the working parts of the machine.

I claim as my invention—

1. The combination, in a potato-digging machine, of a mold-board plow for turning over the hill of potatoes with revolving prongs situated at the rear of the plow on the mold-board side and in line with the overturned ground containing the potatoes, and adapted to remove the potatoes from the turned furrow, all substantially as specified.

2. The combination, in a potato-digging machine, of a mold-board plow for turning over the hill of potatoes and revolving prongs situated at the rear of the plow on the mold-board side and in line with the turned-up ground containing the potatoes, and sufficiently above the bed of the cut furrow to remove only the potatoes, with a shaker at one side of the revolving prongs to receive the potatoes and drop them on the ground directly in the rear of the plow, substantially as and for the purpose set forth.

3. The combination, in a potato-digging machine, of a mold-board plow with a series of revolving bent prongs having ends rearwardly curved both in respect to the forward movement of the digger and the revolving movement of the shaft E, so that the bent portion of the prongs and not the points will remove the potatoes, as and for the purpose described.

4. The combination of the mold-board plow with a traction-wheel, H, shaft F, geared thereto, the shaker S, operated by the said shaft, a shaft, E, carrying prongs and geared to the shaft F, substantially as set forth.

5. The combination of a plow and traction-wheel with a shaft, F, geared to the said wheel and having tappets, a shaker, S, a lever, l, and a rod, n, substantially as set forth.

In testimony whereof I have signed my name to this specification in the presence of two subscribing witnesses.

JESSE W. ROBERTS.

Witnesses:
HENRY HOWSON,
HARRY SMITH.